(12) United States Patent
Somekh et al.

(10) Patent No.: US 7,406,072 B1
(45) Date of Patent: *Jul. 29, 2008

(54) MODEM RELAY OVER PACKET BASED NETWORK

(75) Inventors: Oren Somekh, Emek-Israel (IL);
Abraham Fisher, Haifa (IL); Yona Sivan, Safed (IL)

(73) Assignee: Surf Communication Solutions (IL)

( * ) Notice: Subject to any disclaimer, the term of this patent is extended or adjusted under 35 U.S.C. 154(b) by 1276 days.

This patent is subject to a terminal disclaimer.

(21) Appl. No.: 10/276,765

(22) PCT Filed: Aug. 13, 2000

(86) PCT No.: PCT/IL00/00492

§ 371 (c)(1),
(2), (4) Date: Nov. 20, 2002

(87) PCT Pub. No.: WO01/91441

PCT Pub. Date: Nov. 29, 2001

(30) Foreign Application Priority Data

May 21, 2000 (WO) .................. PCT/IL00/00288
Jun. 14, 2000 (IL) ...................... 136775

(51) Int. Cl.
*H04L 12/66* (2006.01)
(52) U.S. Cl. .................... 370/352; 370/401
(58) Field of Classification Search ......... 370/352–356, 370/278, 282, 395.5, 401
See application file for complete search history.

(56) References Cited

U.S. PATENT DOCUMENTS

| | | |
|---|---|---|
| 5,546,388 A | 8/1996 | Lin et al. |
| RE35,740 E | 3/1998 | Piasecki et al. |
| 5,790,641 A | 8/1998 | Chan et al. |
| 6,044,107 A | 3/2000 | Gatherer et al. |
| 6,069,879 A | 5/2000 | Chatter |
| 6,301,229 B1 | 10/2001 | Araujo et al. |
| 6,360,075 B1 | 3/2002 | Fischer et al. |

(Continued)

FOREIGN PATENT DOCUMENTS

WO    WO 99/38351    7/1999

(Continued)

OTHER PUBLICATIONS

Surf Communication Solutions Ltd., Comparison Between Possible Procedures For Real-Time Voice Band Modem Communication Over Packet Networks (MoIP), Nov. 9-10, pp. 1-4.

(Continued)

*Primary Examiner*—Suhan Ni
(74) *Attorney, Agent, or Firm*—Factor Patent Attorneys; Yaakov Schatz (57) ABSTRACT

A method of transmitting signals between a source modem and a destination modem. The method includes transmitting the signals from the source modem, over a first switched network path, to a first interface, encapsulating the at least some of the signals received by the first interface into packets, transmitting the packets from the first interface over a packet-based network to a second interface, removing the encapsulation of the signals at the second interface; and transmitting the data signals from the second interface over a second switched network path to the destination modem.

25 Claims, 7 Drawing Sheets

U.S. PATENT DOCUMENTS

| | | |
|---|---|---|
| 6,434,169 B1 | 8/2002 | Verreault |
| 6,446,232 B1 | 9/2002 | Chan et al. |
| 6,522,640 B2 | 2/2003 | Liebenow |
| 6,522,688 B1 | 2/2003 | Dowling |
| 6,560,197 B1 | 5/2003 | LeVieux et al. |
| 6,646,998 B1 | 11/2003 | Räsänen |
| 6,667,986 B1 | 12/2003 | Rozman et al. |
| 6,711,704 B1 | 3/2004 | Tezuka |
| 6,757,250 B1 | 6/2004 | Fayad et al. |
| 6,842,458 B1 | 1/2005 | Reznic |
| 6,934,325 B2 | 8/2005 | Maytal |
| 6,973,180 B1 | 12/2005 | Kunisch et al. |
| 2002/0082047 A1 | 6/2002 | Souissi et al. |
| 2002/0133528 A1 | 9/2002 | Zolti et al. |

FOREIGN PATENT DOCUMENTS

| | | |
|---|---|---|
| WO | WO 99/38352 | 7/1999 |
| WO | WO 99/39530 | 8/1999 |
| WO | WO 99/40685 | 8/1999 |
| WO | WO 00/11843 | 3/2000 |
| WO | WO 01/01654 | 1/2001 |
| WO | WO 01/35228 | 5/2001 |
| WO | WO 01/60008 | 8/2001 |
| WO | WO 01/97503 | 12/2001 |

OTHER PUBLICATIONS

ITU-T Telecommunication Standardization Sector of ITU; "Series V: Data Communication Over the Telephone Network—General;" "Procedures for Starting Sessions of Data Transmission Over the Public Switched Telephone Network;" Feb. 1998; International Telecommunication Union (ITU) V.8.

ITU-T Telecommunication Standardization Sector of ITU; "Data Communication Over the Telephone Network;" "1200 Bits per Second Duplex Modem Standardized for Use in the General Switched Telephone Network and on Point-to-Point 2-Wire Leased Telephone-Type Circuits;" 1993; International Telecommunication Union; ITU-T Recommendation V.22.

ITU-T Telecommunication Standardization Sector of ITU; "Data Communication Over the Telephone Network;" "A Family of 2-Wire, Duplex Modems Operating at Data Signalling Rates of up to 9600 bit/s for Use on the General Switched Telephone Network and on Leased Telephone-Type Circuits;" Mar. 1993; International Telecommunication Union; ITU-T Recommendation V.32.

ITU-T Telecommunication Standardization Sector of ITU; "Series V: Data Communication Over the Telephone Network—Interfaces and Voiceband Modems;" "A Modem Operating at Data Signalling Rates of up to 33 600 Bits/s for Use on the General Switched Telephone Network and on Leased Point-to-Point 2-Wire Telephone-Type Circuits;" Oct. 9, 1996; International Telecommunication Union; ITU-T Recommendation V.34, XP002082229.

ITU-T Telecommunication Standardization Sector of ITU; "Series T: Terminals for Telematic Services;" "Procedures of real-time Group 3 facsimile communication over IP networks;" Jun. 18, 1998; International Telecommunication Union; ITU-T Recommendation T.38, XP002163782.

ITU-T Telecommunication Standardization Sector of ITU; "Series V: Data Communication Over the Telephone Network—Simultaneous Transmission of Data and Oyher Signals;" "A Digital Modem and Analogue Modem Pair of Use on the Public Switched Telephone Network (PSTN) at Data Signalling Rates of up to 56,000 Bits/s Downstream and up to 33,600 Bits/s Upstream;" Sep. 1998; International Telecommunication Union (ITU) V.90.

ITU-T Telecommunication Standardization Sector of ITU; "Series V: Data Communication Over the Telephone Network—Simultaneous Transmission of Data and Other Signals;" "Enhancements to Recommendation V.90;" Nov. 2000; International Telecommunication Union (ITU) V.92.

Gieseler, S.; Tunnelbau. Remote-Access-Server als Basis für Virtual Private Networks; Net—Zeitschrift Fuer Kommunikationsmanagement, Huthig Verlag; vol. 52; No. 8/9; 1998; pp. 38-40; XP000782761.

Yu, S. et al.; "A Multimedia Gateway for phone/fax and MIME Mail;" Aug. 25, 1997; Computer Communications; vol. 20; No. 8; pp. 615-627; XP004126715.

MODEM RELAY OVER PACKET BASED NETWORK

RELATED APPLICATIONS

The present application is a U.S. national application of PCT/IL00/00492, filed on Aug. 13, 2000. This application is also related to PCT Application No. PCT/IL00/00288, filed on May 21, 2000, the disclosure of which is incorporated herein by reference.

FIELD OF THE INVENTION

The present invention relates to communication systems and in particular to systems which utilize modems.

BACKGROUND OF THE INVENTION

Traditional telephone networks comprise switched networks, e.g., the public switching telephone network (PSTN) and ISDN lines, in which a physical link path is established between the end users of a call. The voice signals of the call are passed, generally in a time domain multiplexed (TDM) manner, on the physical link path. On the other hand, data networks, such as the Internet, are generally packet based networks.

Due to the wide availability of switched network lines, these lines are commonly used to access packet based networks.

Figure 1:
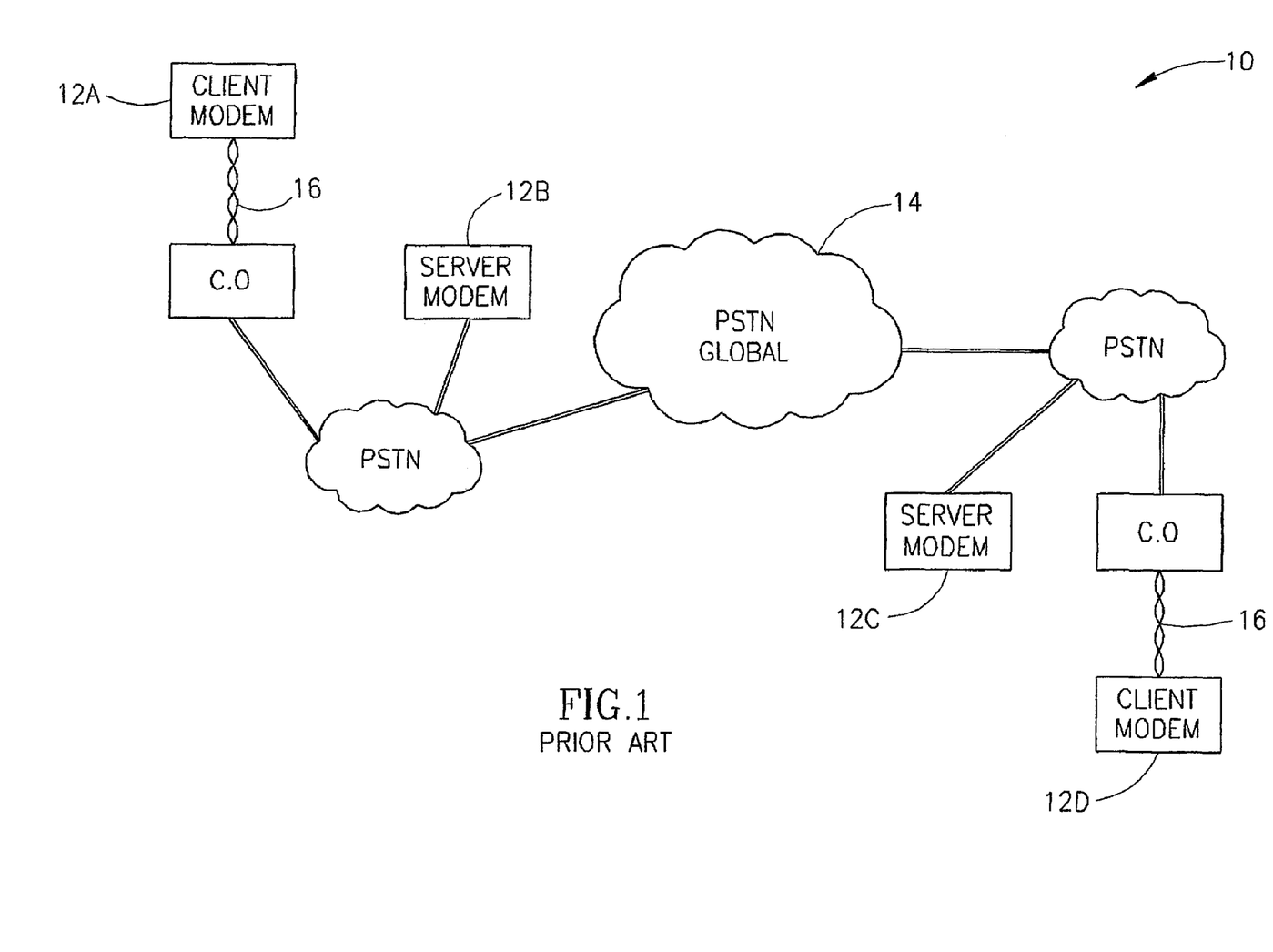
FIG. 1 is a schematic illustration of use of a switched network in carrying voice band modem (VBM) connections, as is known in the art.

FIG. 1 is a schematic illustration of use of a switched network 10 in carrying voice band modem (VBM) connections, as is known in the art. A pair of modems 12 (marked 12A, 12B, 12C and 12D) form a VBM connection with each other through the PSTN 14. In establishing the connection, the pair of modems 12 perform a negotiation stage in which the parameters test the line and determine operation parameters, e.g., a data rate and/or protocol, according to which data will be transferred over the connection. Thereafter, a data transfer stage is performed at which the modems modulate and demodulate the data packets they are provided and pass the modulated signals over the connection. As is known in the art, VBM connections may be established between client modems 12A and 12D, which are connected to PSTN 14 through twisted pairs 16, between server modems 12B and 12C which are connected directly to the infrastructure of the PSTN, or between a server modem and a client modem. The various connections may be established in accordance with various ITU recommendations, such as V.34, V.90, V.91 and V.92.

Existing PSTN hardware cannot support the increasing demand for all types of communication services, and therefore additional hardware is added to the PSTN instead of, or in addition to, the current hardware of the PSTN. In many cases, packet based networks are cheaper to install and maintain than switched networks. Therefore, telephony providers are adding many packet based lines and/or networks to their infrastructure, especially to their long distance calls infrastructure.

Figure 2:
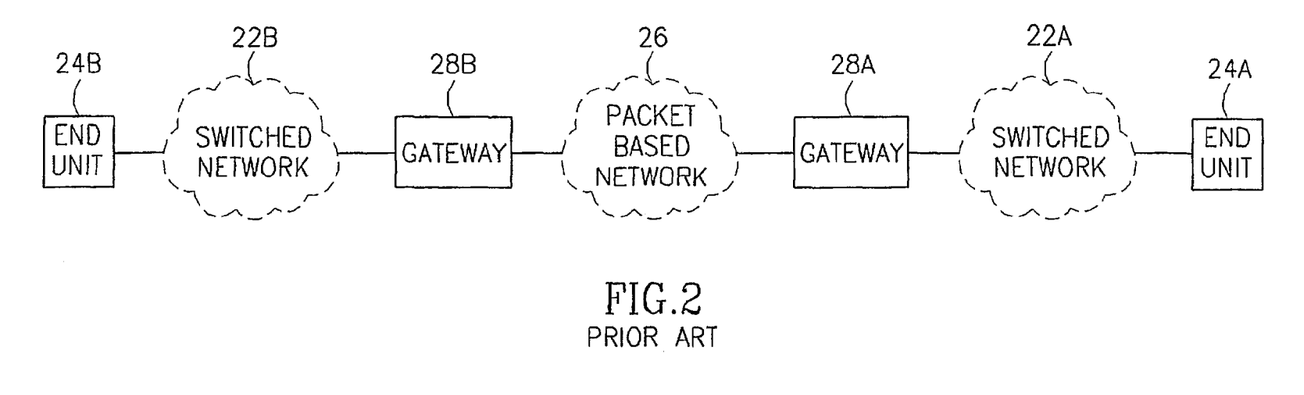
FIG. 2 is a schematic illustration of a telephone hybrid connection, known in the art.

FIG. 2 is a schematic diagram of a telephone connection 20 known in the art, which includes a segment on a packet based network 26 as well as segments on switched networks 22. Voice signals transferred from an end unit 24A (e.g., a telephone set) are passed along switched network 22A, using standard telephony methods, to a gateway 28A. Gateway 28A packs the stream of signals from end unit 24A into packets and passes the packets over packet based network 26 to a second gateway 28B. Gateway 28B unpacks the received packets and passes them in a stream on switched network 22B to an end unit 24B. A similar process is performed on signals transferred in the opposite direction.

The travel time of packets through packet based network 26 may vary for different packets of a single connection. Therefore, gateway 28B maintains a buffer which delays the packets it receives for a short period allowing the gateway to organize the packets in their original order. When packets are not received within the short delay, gateway 28B generates filler signals to replace the delayed packet. If only a small percentage of packets are delayed beyond the allowed period (or are otherwise lost), telephone conversations are passed with sufficient quality such that the loss of packets is substantially unnoticed.

The telephone network is used, in addition to voice exchange, for other services, such as fax and data exchange using voice band modems (VBM). In fax connections, image data is modulated onto voice signals, which are transmitted over switched networks 22 together with control information. The loss of a relatively small percent of the modulated signals is sufficient to prevent demodulation of the signals. Therefore, when gateway 28A receives fax signals, the gateway demodulates the signals and passes them to gateway 28B in a predetermined packet format, for example as described in the T.38 ITU-T recommendation, "Procedures for real-time Group 3 facsimile communication over IP networks", the disclosure of which is incorporated herein by reference. Gateway 28A identifies the fax signals using methods such as described, for example, in U.S. Pat. No. RE35,740, the disclosure of which is incorporated herein by reference. Gateway 28B extracts the fax data from the packets and re-modulates the fax data for transmission on links of switched network 22B.

It is noted that most VBM connections are local connections to Internet service providers (ISP), which provide gateway services to packet-based networks. Nonetheless, there are cases when it is desired to create long distance modem connections, for example, for remote access (RAS) applications.

VBM sessions are formed of a negotiation stage in which the end-modems of the session choose parameters of the session, such as the protocol and data rate, and a data transmission stage in which data is exchanged between the modems.

SUMMARY OF THE INVENTION

An aspect of some embodiments of the present invention relates to forming a connection between two end modems over a hybrid link path, which includes at least one packet-based segment. Such connection between two end modems is referred to herein as a MoIP (modem over IP) connection. In some embodiments of the invention, the MoIP connection includes a single packet based segment and a pair of switched link paths which connect the modems to the packet based segment. In some embodiments of the invention, gateways on the edges of the packet based segment conduct separate VBM sessions with the end modems establishing the MoIP connection.

In some embodiments of the invention, each of the gateways forms a VBM connection with its respective end modem with parameters (e.g., data rate, modem standard) which are independent of the parameters of the VBM connection of the other gateway. In some of these embodiments, the gateways perform error correction and/or data compression and, when necessary, request retransmission of data not properly received.

In some embodiments of the invention, the VBM connections between the gateways and their respective end units are correlated such that they operate in accordance with the same modem protocol and at the same data rate. In some embodiments of the invention, the gateways transmit to each other control packets, which include information they use in determining the modem protocol and/or data rates they plan to use on their VBM connection. In some embodiments of the invention, during negotiation stages of the MoIP connection, the gateways send stalling signals, referred to as spoofing signals, to their respective end modems until they receive input from the other gateway on the modem and link capabilities of the VBM connection established by the other gateway. The stalling signals prevent the progression of the negotiation procedure without causing the termination of the connection.

In some embodiments of the invention, the gateways do not perform error correction and/or data compression (ECDC). Error correction and/or data compression are optionally managed by the end modems of the MoIP connection. Not performing error detection and/or data compression by the gateways substantially reduces the delay of the signals on the MoIP connection.

In an embodiment of the invention, during a V.8 connection which requires reception of two consecutive identical packets in order to proceed, the specific series of packets used to stall the connection includes a series of valid packets, which should be currently transmitted according to the standard, in which no two consecutive packets have identical values.

Alternatively or additionally, the gateways lengthen the transmission time of one or more of the signals they transmit according to the standard they are using. For example, in the V.8 standard, instead of transmitting the JM signal immediately upon receiving a correct CM signal, the gateway continues to transmit the ANSam signal until it receives from the other gateway the information it needs in order to transmit the JM signal.

In some embodiments of the invention, rather than transmitting a series of packets which stalls the connection, a packet with probable values is transmitted continuing the negotiation procedure. If, upon receiving information from the other connection, the values of the transmitted packet are found not to conform to the other modem connection, a retrain is initiated and the negotiation process is re-started using the received information from the other modem connection.

In some embodiments of the invention, when the MoIP connection carries filler bits which do not represent information, the filler bits are not passed on the packet based segment. The gateways fill in the missing filler bits based on control signals they receive from the other gateway and/or responsive to not receiving bits at the data rate of the connection.

There is therefore provided in accordance with an embodiment of the invention, a method of transmitting signals between a source modem and a destination modem, including transmitting the signals from the source modem, over a first switched network path, to a first interface; encapsulating the at least some of the signals received by the first interface into packets, transmitting the packets from the first interface over a packet-based network to a second interface, removing the encapsulation of the signals at the second interface, and transmitting the data signals from the second interface over a second switched network path to the destination modem.

In some embodiments, the first and second switched network paths carry the same bit content of signals. In some embodiments, the signals transmitted on the first and second switched paths carry the same information. Optionally, the transmitted signals include IP packets and the IP packets transmitted on the first and second switched paths carry identical IP headers. In some embodiments, transmitting the packets over the packet based network to the second interface includes regulating the delay of the packets provided to the second interface.

In some embodiments, encapsulating at least some of the signals includes determining whether the signals have an information content and not encapsulating at least some of the signals determined not to have an information content. In some embodiments, the source and destination modems include server modems or client modems. Alternatively or additionally, one of the source and destination modems includes a client modem and the other of the source destination modems includes a server modem. In some embodiments, the data signals are received by the destination modem in a manner which does not allow determination of whether the signals were passed on the packet based network or were passed on a single switched path.

In some embodiments, the signals are transmitted on the first switched network path to the first interface at the same rate as the signals are transmitted from the second interface on the second switched network path. Alternatively, the signals are transmitted on the first switched network path to the first interface at a different rate than the signals are transmitted from the second interface on the second switched network path.

Optionally, transmitting the packets over a packet based network includes transmitting over a UDP connection. In some embodiments, the first interface encapsulates the signals without performing error correction or data compression. Alternatively or additionally, transmitting the packets over a packet based network includes transmitting over a TCP connection. In some embodiments, encapsulating the at least some of the signals includes demodulating the signals received by the first interface.

In some embodiments the method includes transmitting signals from the destination modem, over the second switched network path, to the second interface, encapsulating the at least some of the signals received by the second interface from the destination modem, into packets, transmitting the packets generated by the second interface over the packet based network to the first interface, removing the encapsulation of the signals from the second interface at the first interface and transmitting the signals from the first interface over the first switched network path to the source modem. Optionally, the signals transmitted on the second switched network path to the second interface at the same rate as the signals are transmitted from the first interface on the first switched network path to the source modem.

There is further provided in accordance with an embodiment of the invention, a method of correlating parameters of a plurality of voice band modem (VBM) connections, including beginning a negotiation stage of a first switched network connection, beginning a negotiation stage of a second switched network connection, receiving values of one or more parameters of the second connection by a modem of the first connection and completing the negotiation stage of the first switched network connection based on the one or more parameters of the second connection. Optionally, the method includes transmitting spoofing signals on the first connection by the modem of the first connection until the values of the one or more parameters of the second connection are received. Optionally, transmitting spoofing signals includes lengthening the transmission of a control signal beyond a necessary transmission time of the control signal.

In some embodiments, lengthening the transmission of the control signal beyond its normal transmission time includes transmitting the control signal after the reception of a signal which normally causes the termination of the transmission of the control signal.

There is further provided in accordance with an embodiment of the invention, a gateway for transferring voice band modem signals between a switched network and a packet based network, including a modem which receives modulated signals, a packet interface which leads to a packet based network and a controller which encapsulates at least some of the received signals into packets for transmission through the packet interface on a packet connection which is selected without relation to the contents of the signals.

Optionally, the modem includes a data pump which demodulates the received signals. In some embodiments, in encapsulating the received signals, the controller generates IP headers which are not related to possible IP headers included in the received signals. In some embodiments, the controller encapsulates substantially all the received signals which are not control signals. Alternatively, the controller does not encapsulate received signals which do not carry information. In some embodiments, the controller prepares packets for transmission on the packet connection in place of at least some of the received signals which are control signals.

In some embodiments, the modem responds to at least some of the control signals which the controller encapsulates. In some embodiments, the modem does not include an error correction layer. In some embodiments, the modem responds to at least some of the received signals which are control signals. In some embodiments, the modem delays its response to at least one of the received control signals during a negotiation session. In some embodiments, the packet interface also receives encapsulated signals, the controller removes the encapsulation of the signals received by the packet interface and the modem transmits the signals whose encapsulation was removed.

There is further provided in accordance with an embodiment of the invention, a system for transmission of modem signals over a packet based network, including a first gateway which receives modem signals from a first modem, encapsulates at least some of the modem signals into packets and transmits the packets over the packet based network and a second gateway which receives the encapsulated signals transmitted from the first gateway over the packet based network, removes the encapsulation of the signals and transmits at least some of the signals to a second modem. Optionally, the second modem receiving the signals from the second gateway cannot determine whether the received signals were transmitted from the gateway or directly from the first modem without passing over the packet based network.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 3:
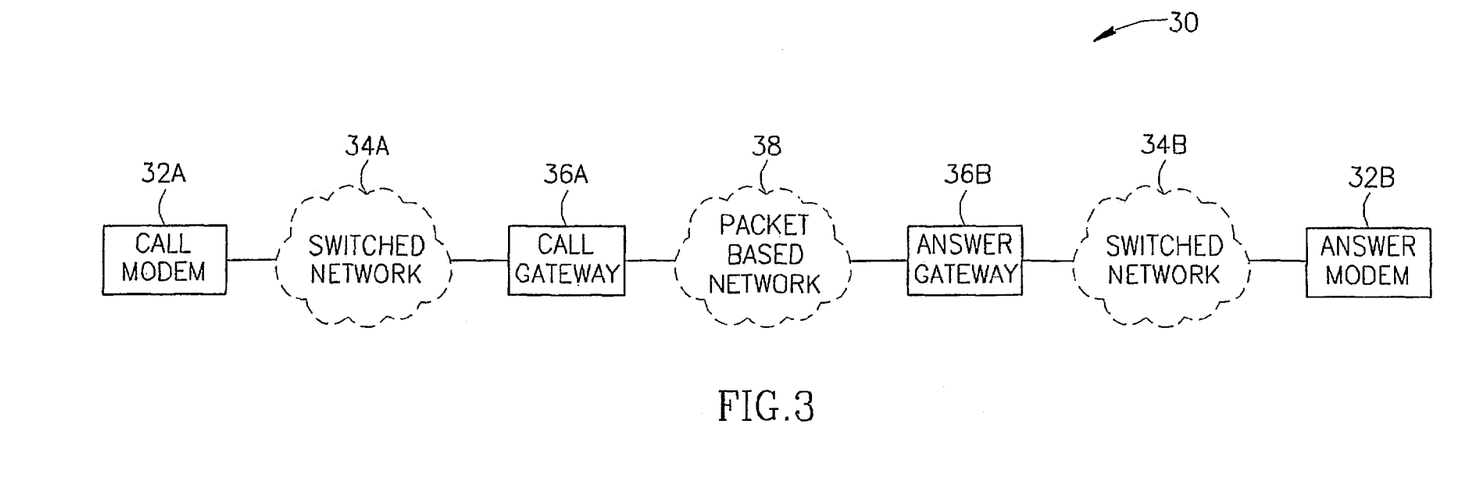
FIG. 3 is a schematic illustration of a hybrid modem connection useful in illustrating an embodiment of the present invention.

FIG. 3 is a schematic illustration of a MoIP connection 30, in accordance with an embodiment of the present invention. A call modem 32A establishes a connection with an answer modem 32B, which connection is formed of three segments in series. In some embodiments of the invention, modems 32A and 32B are both server modems or both digital modems. Alternatively, one of modems 32A and 32B is a client modem and the other modem is a server modem. A first segment of the MoIP connection passes on a switched network 34A between call modem 32A and a call gateway 36A. A second segment connects call gateway 36A and an answer gateway 36B through a packet based network 38. A third segment connects answer gateway 36B and answer modem 32B on a switched network 34B. In some embodiments of the invention, the first and third segments carry the same data signals, although they may carry different control signals. That is, if the data signals transmitted between modems 32A and 32B comprise, for example, IP packets, the headers of the IP packets on the first and third segments are identical, e.g., the TTL field has the same value. Alternatively, the first and third segments carry the same bits which contain information, although filler data signals which do not carry information may be sent differently on the different segments.

In some embodiments of the invention, packet based network 38 has at least a predetermined quality of service (QoS) level, i.e., a relatively low packet loss rate, delay and/or jitter, in order to provide acceptable communication levels of service.

In an embodiment of the present invention, connection 30 is established using connection establishment procedures substantially as used for establishing voice over IP (VoIP) connections, for example, the procedures of the H.323 protocol and/or the session initiation protocol (SIP). In forming the connection, one or more packet connections of a packet transport protocol (e.g., transmission control protocol (TCP) or user datagram protocol (UDP)) are established on packet based network 38. Optionally, in forming the connection, call modem 32A notifies that the connection is a modem connection and gateways 36A and 36B are chosen to belong to the connection and/or are set accordingly. For example, the notification may be based on the telephone number dialed which is included in a list of modem numbers. Alternatively or additionally, gateways 36A and 36B recognize that the connection is a modem connection based on, for example, the 2100 Hz signal which is transmitted at the beginning of the use of the connection.

In some embodiments of the invention, call modem 32A and/or answer modem 32B are standard modems which are not altered in order to perform the present invention. Furthermore, in some embodiments, call modem 32A and answer modem 32B do not know whether they are connected directly over a switched line or through gateways 36A and 36B.

Call modem 32A and/or answer modem 32B may be connected to switched network 34B through any switched lines, analog or digital.

Figure 4:
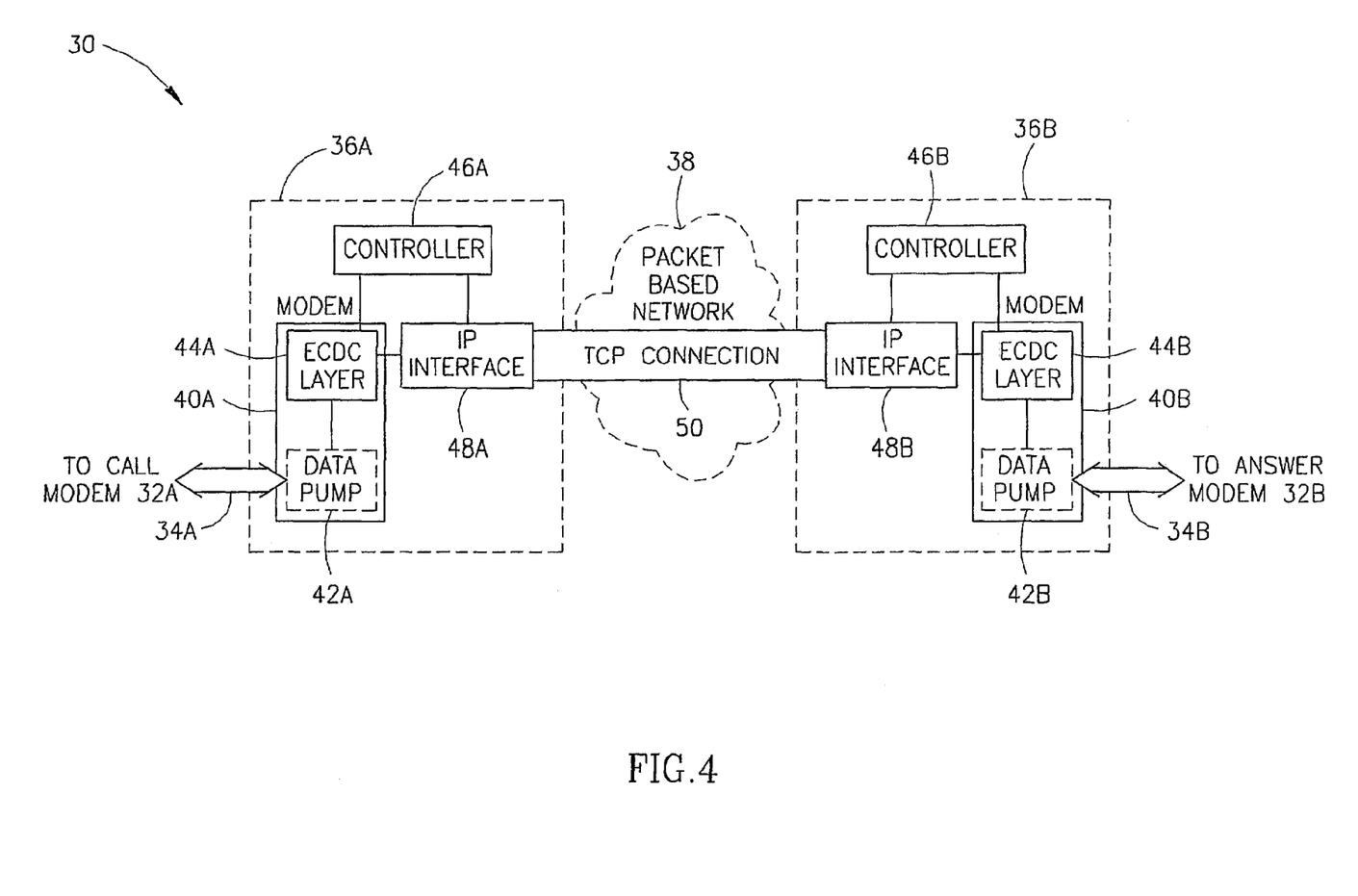
FIG. 4 is a schematic block diagram of gateways in a composite modem connection, in accordance with an embodiment of the present invention.

FIG. 4 is a schematic block diagram of gateways 36A and 36B and the connection between them, in accordance with an embodiment of the present invention. Gateways 36A and 36B include gateway modems 40A and 40B which communicate with modems 32A and 32B over switched networks 34A and 34B, respectively. Gateway modems 40 include data pumps 42 which modulate and demodulate the signals passed on switched networks 34A and 34B, and error correction data compression (ECDC) layers 44 which perform flow control and request retransmission of bits which were not received correctly. Each of gateways 36 also includes an IP interface 48 which communicates with the interface 48 in the other gateway through packet based network 38. As is known in the art, each packet transmitted over packet based network 38 comprises a header which identifies the connection to which it belongs. Thus, IP interface 48 may receive packets belonging to a plurality of different connections 30 and sort them out according to their headers.

In some embodiments of the invention, IP interfaces 48 communicate over a connection of a delivery confirming protocol, such as over a TCP connection 50 established, within packet based network 38.

In some embodiments of the invention, data signals received by either of units ECDC layer 44 and IP interface 48 are passed directly to the other unit (of ECDC layer 44 and IP interface 48) within the same gateway, for forwarding to their destination. Control packets or signals, on the other hand, are examined, for example, by a controller 46 which determines which actions are to be performed responsive to the control signals and whether the control signals should be forwarded by the other unit, as described in detail in the following description.

A negotiation stage begins with call modem 32A (FIG. 3) sending a call setup signal (e.g., CI of the V.8) over connection 30 to answer modem 32B. The call setup signal is received by modem 40A of call gateway 36A which responds on switched network 34A according to the predetermined procedures agreed between modems 32A, 32B and 40, e.g., according to the ITU-T V series recommendations (V.8, V.34, V.90, V.91, etc.). In addition, controller 46A sends, through IP interface 48A of call gateway 36A, a control packet to IP interface 48B of answer gateway 36B. Responsive to receiving the control packet, controller 46B of gateway 36B instructs its modem 40B to send a call setup signal to answer modem 32B and continue the procedures of negotiation and training, as is known in the art. It is noted that the training and negotiating procedures of modems 32A and 40A and of modem 32B and 40B are performed independently of each other and the data in control signals passed during the negotiation is not passed over TCP connection 50. Therefore, the connections between modems 32A and 40A and modem 32B and 40B may be at different rates and even according to different protocols. Optionally, renegotiation and retraining procedures performed on one modem connection do not affect the other modem connection.

In some embodiments of the invention, ECDC layer 44 includes a buffer which stores the data received from IP interface 48, when it is received at a rate faster than can be sent on the modem connection. Alternatively or additionally, IP interface 48 maintains a buffer for the signals being passed to ECDC layer 44.

In some embodiments of the invention, only if the negotiating fails, e.g., between modems 32A and 40A, gateway 36A notifies gateway 36B so that it will disconnect the connection between modems 32B and 40B. Likewise, when one of call and answer modems 32A and 32B terminate their modem connection, the respective gateway notifies the other gateway so that it will also terminate the other modem connection. The notification may be performed, for example, by closing the TCP connection 50 between the gateways. In an embodiment of the invention, when one of the modem connections is terminated the other modem connection is immediately terminated. Alternatively, the other modem connection is maintained for a predetermined period in case the terminated connection is promptly reestablished.

Alternatively, to using a single TCP connection 50 for communication between IP interfaces 48, separate TCP connections are used for control (e.g., setup negotiation signals) and data messages.

In some embodiments of the invention, ECDC layer 44 examines the signals passing through gateway 36 to determine when the signals do not carry information. Such signals are generated by modems 32 when they have no information to send in order to continuously transmit signals at a constant negotiated rate. Optionally, signals which do not carry information are discarded in order to reduce the load on packet based network 38. In some embodiments of the invention, control signals identifying the discarded signals, are transmitted instead of the discarded signals such that the other gateway 36 may regenerate the discarded signals.

Figure 5:
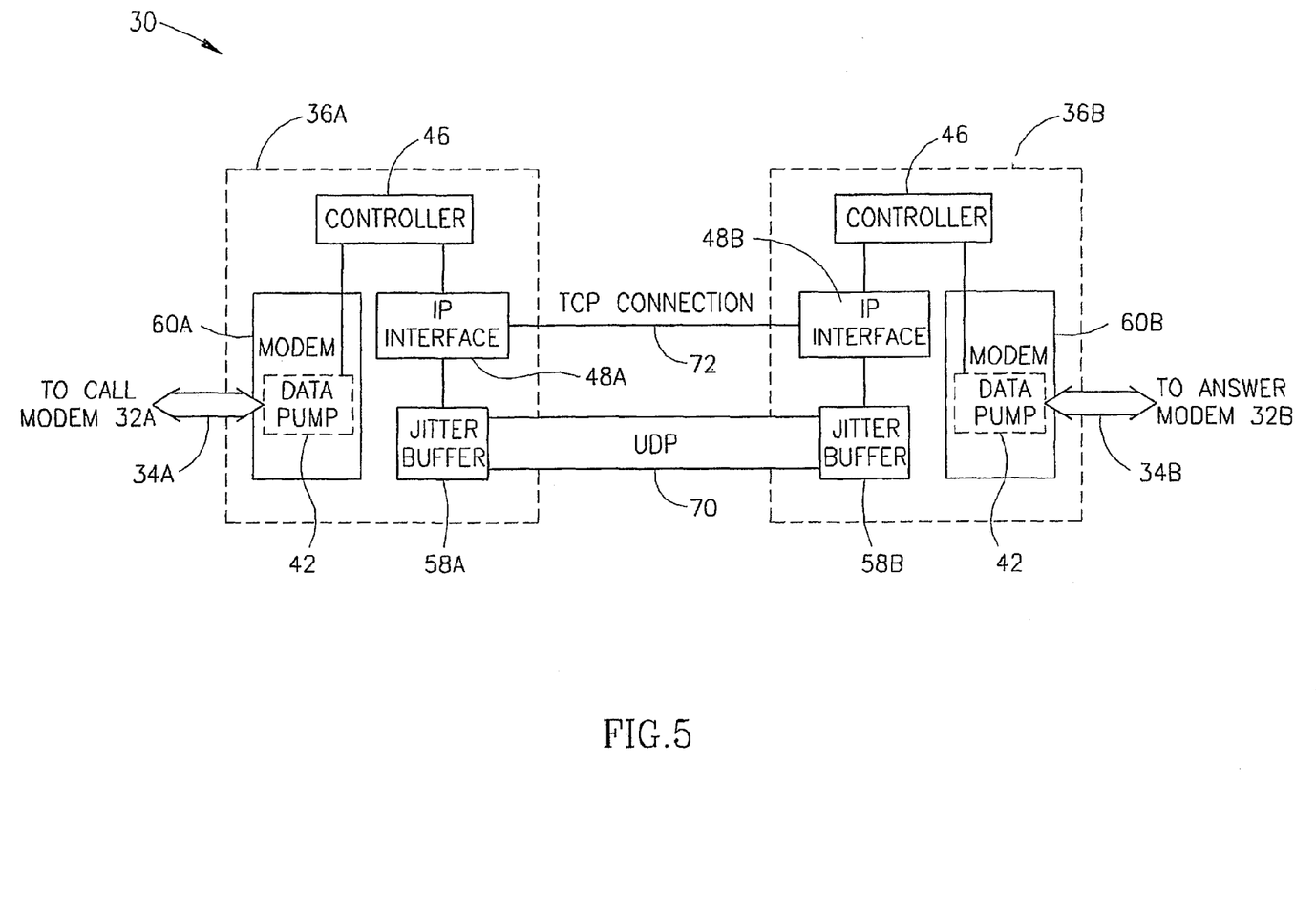
FIG. 5 is a schematic block diagram of gateways in a composite modem connection, in accordance with another embodiment of the present invention.

FIG. 5 is a schematic block diagram of gateways 36A and 36B and the connections between them, in accordance with another embodiment of the present invention. In the embodiment of FIG. 5, gateways 36A and 36B include IP interfaces 48 and controllers 46 similar to that described above, but include modems 60 which do not perform error correction data compression (ECDC) tasks. Instead, data signals are passed through gateways 36A and 36B without delay and the ECDC tasks are performed by call and answer modems 32A and 32B. In some embodiments of the invention, IP interfaces 48 exchange signals using one or more connections of a protocol which does not provide delivery confirmation, e.g., UDP. Not performing ECDC by gateways 36, reduces the signal delay over connection 30. In an exemplary embodiment, the transmission time from call modem 32 to answer modem 32B is about 100 msec when ECDC is not performed by gateways 36A and 36B, while when ECDC is performed by the gateways and the TCP protocol is used for transmission between IP interfaces 48, about an additional 250 msec are added to the transmission time, under normal conditions.

Furthermore, not providing ECDC by modems 60 simplifies the modems and reduces the power consumption of the modems. It is noted that modem 60 may be part of a modem array. By not performing ECDC by modem 60, the number of connections handled by the modem array is substantially larger than if ECDC is performed.

In an embodiment of the invention, IP interfaces 48 exchange data signals on a UDP connection 70 and control signals on a TCP connection 72. Alternatively, the control signals are exchanged on a UDP connection; either the same connection as used for the data or a separate connection. Optionally, some or all of the control messages are transmitted a plurality of times, e.g., three to five times, to ensure that the control messages are received. In some embodiments of the invention, the number of times the control messages are transmitted depends on the importance of the messages.

Modems 60 generally include data pumps 42 which modulate and demodulate the signals which pass through gateways 36A and 36B. In some embodiments of the invention, modem 60 checks the contents of the demodulated signals and transfers data signals directly to IP interface 48 to be sent to the peer gateway through packet based network 38. Demodulated control signals are transferred to controller 46 for handling as is now described.

IL some embodiments of the invention, during the negotiation, gateways 36A and 36B ensure that the connections on networks 34A and 34B follow the same protocols and operate at the same upstream rates and the same downstream rates (the upstream and downstream rates are not necessarily the same). Alternatively, gateways 36A and 36B ensure that in the upstream from call modem 32A to answer modem 32B the data rate of the connection from gateway 36B to answer modem 32B is greater than the data rate of the connection from call modem 32A to gateway 36A. In this alternative the downstream from answer modem 32B to call modem 32A, the data rate of the connection from gateway 36A to call modem 32A is greater than the data rate of the connection from answer modem 32B to gateway 36B. This alternative is, however, wasteful in bandwidth and/or in processing resources and requires that modems 32A, 32B and 60 support asynchronous transmission mode.

In some embodiments of the invention, gateways 36A and 36B include jitter buffers 58 which delay the data packets transmitted on UDP connection 70 for a predetermined time in order that substantially all the data packets passed on the UDP connection undergo equal delay. In some embodiments of the invention, jitter buffers 58 are relatively large relative to jitter buffers used for VoIP, such that even if there is a drift in one of the clocks of switched networks 34A or 34B the jitter buffers will not overflow or underflow frequently. Alternatively or additionally, the sizes of jitter buffers 58 are determined based on the current delay and/or loss rate of packet based network 38, using methods known in the art for VoIP.

Figure 6:
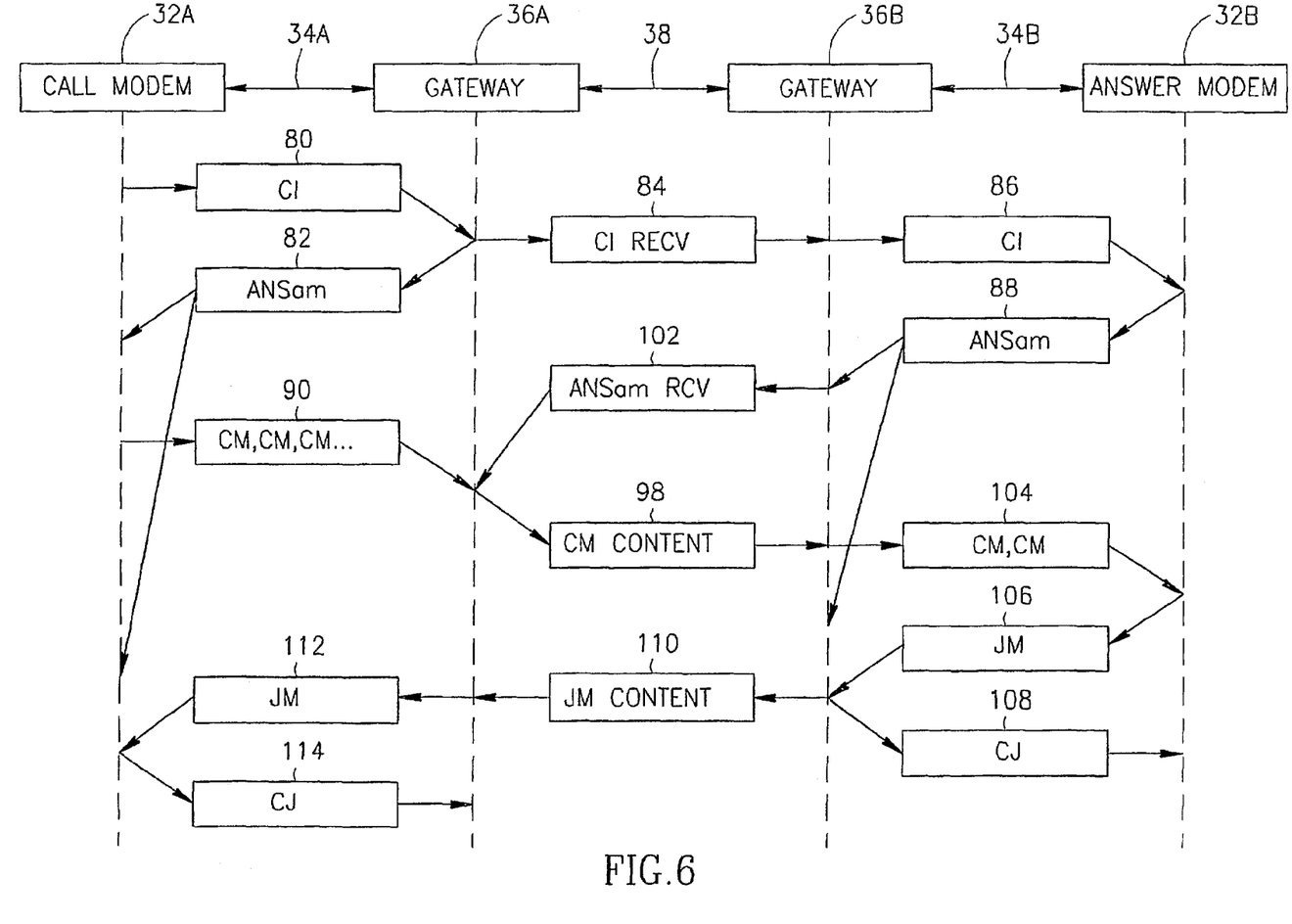
FIG. 6 is a schematic time chart of the operations performed in the first phase of establishing a composite modem connection, in accordance with an embodiment of the present invention.

FIG. 6 is a schematic time chart of the operations performed by call and answer modems 32A and 32B and gateways 36A and 36B of FIG. 5, in the first phase of establishing a connection, in accordance with an embodiment of the present invention. As is known in the art, in initiating a connection according to the V.8 standard, call modem 32A sends after a second, CI signals 80 along switched network 34A. CI signals are received by modem 60A (FIG. 5) of gateway 36A which responds, as required by the V.8 recommendation, with the ANSam signal 82, as defined by the V.8 standard. Substantially in parallel, IP interface 48A sends a CI-RECV packet 84 to IP interface 38B, over TCP connection 72. CI-RECV packet 84 notifies IP interface 48B that CI signals 80 were received. Upon receiving CI-RECV packet 84, IP interface 4813 notifies controller 46B which instructs modem 60B to start sending CI signals 86 to answer modem 32B.

When answer modem 32B detects at least one CI signal 86 it responds with an ANSam signal 88 as defined by the V.8 recommendation. In some embodiments of the invention, modem 60B does not respond to ANSam signal 88 until gateway 36B receives from gateway 36A information on the VBM connection between modem 60A and call modem 32A, as described hereinbelow. Rather, modem 60B continues to transmit CI signal 86 even after ANSam signal 88 is received. According to the V.8 recommendation, modem 32B continues to transmit ANSam signal 88 until modem 60B responds to ANSam signal 88.

In some embodiments of the invention, when modem 60B receives ANSam signal 88, an ANSam RECV packet 102 is sent by IP interface 48B to IP interface 48A.

After receiving ANSam signal 82 from modem 60A, call modem 32A transmits CM signals 90 as defined by the V.8 standard. In some embodiments of the invention, modem 60A continues to transmit ANSam signal 82 even after it receives CM signals 90, in order to stall the VBM connection on switched network 34A until gateway 36A receives information on the VBM connection on switched network 34B from gateway 36B, as described hereinbelow.

Upon receiving CM signal 90, in some embodiments of the invention, IP interface 48A sends to IP interface 48B a CM-RECV message (not shown) which indicates that a CM signal 90 from call modem 32A was received. Alternatively or additionally, CM signal 90 is passed to controller 46 (FIG. 5) for decoding. When controller 46 finishes decoding the CM signal, call IP interface 32 sends a CM-CONTENT message 98 carrying the contents of the received CM signal 90, to IP interface 48B. In an embodiment of the invention, CM-CONTENT message 98 also includes the capabilities of modem 60A. Alternatively or additionally, CM-CONTENT message 98 includes the standards and/or other capabilities supported by both call modem 32A (as indicated in CM signal 90) and modem 60A.

When CM-CONTENT message 98 is received by IP interface 48B, its contents are passed to controller 46B which instructs modem 60B as to which contents it should include in the CM signal it transmits. Upon receiving the instructions, modem 60B immediately, or after a predetermined period, begins to transmit a series 104 of identical CM messages containing the contents instructed by controller 46B.

In some embodiments of the invention, the contents of the CM messages in series 104 are based on the common capabilities of modems 60A, 60B, and call modem 32A. Thus, it is assured that the connections on networks 34 follow the same protocol.

When answer modem 32B receives two identical consecutive CM signals from series 104, it responds with JM signals 106 as required by the V.8 recommendation. Responsive to JM signal 106, gateway 36B transmits the CJ signal 108 and the connection between modem 60B and answer modem 32B moves to the second phase of negotiation, as is known in the art.

Substantially in parallel to transmitting CJ signal 108, gateway 36B sends a JM-CONTENT packet 110 which carries the capabilities of answer modem 32B and optionally of modem 60B. In some embodiments of the invention, JM-CONTENT packet 110 has the same format as CM-CONTENT packet 98. Upon receiving JM-CONTENT packet 110, gateway 36A sends a series of identical JM signals 112, based on the information received in JM-CONTENT packet 110 and optionally the capabilities of modem 60A. Thereafter, call modem 32A responds with a CJ signal 114, as is known in the art, and the connection on network 34A moves into the second phase of negotiation as is known in the art.

Further alternatively or additionally, modem 60B does not transmit CI signals 86 immediately upon receiving CI-RECV packet 84. Instead, modem 60 transmits CI signals 86 only after CM-CONTENT packet 98. Alternatively or additionally, modem 60 transmits CI signals 86 after a predetermined delay such that CM-CONTENT packet 98 will be received about when CM signals 104 should be transmitted.

In some embodiments of the invention, CI-RECV packet 84, ANSam_RECV 102, CM_CONTENT 98, JM_CONTENT 110 and/or other packets transmitted over packet based, network 38, are substantially in accordance with the definitions of packets in the T.38 recommendation. Alternatively or additionally, any other conventions agreed between gateways 36A and 36B and which are compatible with network 38 are used.

Figure 7A:
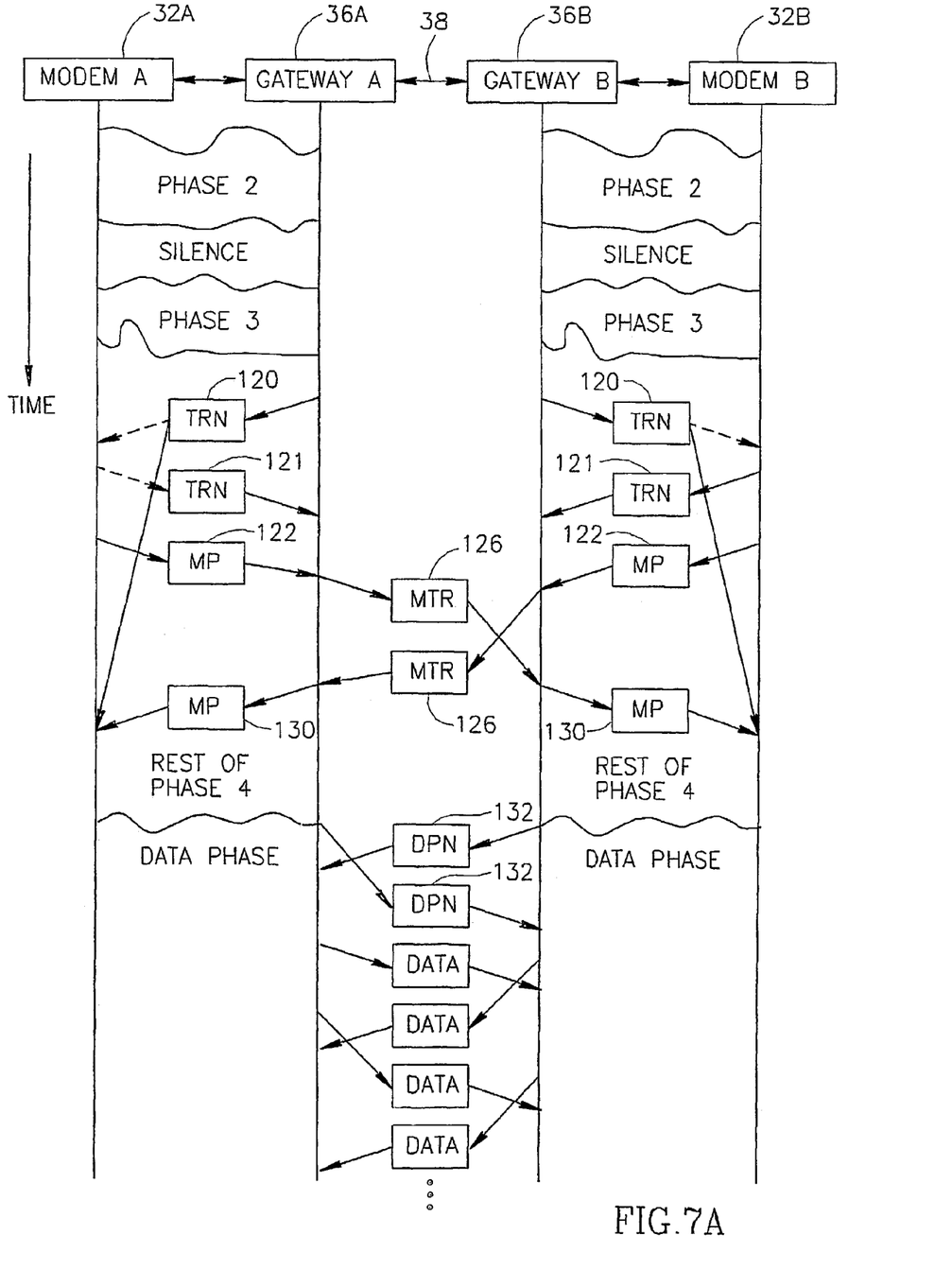
FIG. 7A is a time chart of the operations performed following the first phase of a composite modem connection, in accordance with an embodiment of the present invention.

FIG. 7A is a time chart of the operations performed during the second to fourth phases of a negotiation connection in which the V.34 protocol was chosen in the first phase, in accordance with an embodiment of the present invention. Each pair of modems 32A and 60A and modems 32B and 60B independently performs phases 2 and 3 of the standard negotiation procedures.

In some embodiments of the invention, gateways 36A and/or 36B support all the symbol rates of the V.34 protocol so as to allow maximal symbol rate leeway to end modems 32A and 32B. In some embodiments, the symbol rates used on networks 34A and 34B are determined independent of each other during phase-2, such that the symbol rate used by the connection on network 34A may be different than the connection on network 3413. If the different symbol rates on networks 34A and 34B do not allow the connections on networks 34A and 34B to use the same bit rate, the connections are retrained (i.e., the connections are moved back to phase 2), forcing the connections to agree on a single symbol rate, e.g., the lower of the previously agreed symbol rates on networks 34A and 34B. The chances of the different symbol rates on networks 34A and 34B preventing the connections on networks 34A and 34B from using the same bit rate are relatively slight and therefore in these embodiments, the risk of requiring a retrain is taken in order to allow use of higher bit rates, i.e., above the bit rate of 21,800 which is the maximal bit rate allowed by the 2400 symbol rate in the V.34 protocol.

Alternatively or additionally, gateways 36A and/or 36B deliberately do not identify themselves as supporting symbol rates and/or other phase-2 or phase-3 parameters which may not allow the connections on networks 34A and 34B to reach the same transmission bit rate without changing their symbol rates. In an embodiment of the invention, gateways 36A and/or 36B identity themselves as supporting only the lowest symbol rate, i.e., 2400 symbol/sec. Thus, in case one of networks 34 can only support a bit rate of 2400 or 2600, the other network 34 will be able to establish a connection at the same bit rate.

In some embodiments of the invention, gateways 36A and/or 36B do not generally limit the symbol rates of the connections on networks 34A and 34B. However, if a retrain is required, gateways 36A and/or 36B note the identity (e.g., telephone number) of the modem which requires low bit rates of only 2400 or 2600 and subsequent connections to this modem are performed while forcing use of the 2400 symbol rate. Optionally, the forcing of the use of the 2400 symbol rate is performed only after a predetermined number of connections which required a retrain and/or the time extent of the symbol rate forcing is limited in case the network connection to the modem is improved.

Alternatively, gateways 36A and 36B make sure that the connections on networks 34A and 34B operate with the same symbol rate, using any of the methods described hereinbelow for equalizing the bit rates of the networks.

In the fourth phase, as defined in the V.34 recommendation, modems 32A, 32B, 60A and 60B transmit TRN signals 120 and 121. Thereafter, modems 32A and 32B transmit MP signals 122 which identify the capabilities of the transmitting modems. In some embodiments of the invention, modems 60A and 60B do not immediately transmit MP signals 130 but instead wait until they determine the capabilities of the connection of the other gateway. In order not to leave the connections silent (which may cause disconnection), in some embodiments, modems 60A and 60B continue to transmit the TRN signals 120 until they receive the information required to generate the MP signals.

Upon receiving the MP signals 122 from modems 32A and 32B, respectively, gateways 36A and 36B transmit to each other, over packet based network 38, modem training report (MTR) packets 126. MTR packets 126 identify the capabilities of modems 32A and 32B, respectively, as identified in the MP signals 122 they transmitted. In an embodiment of the invention, MTR packets 126 also identify the capabilities of the modem of the transmitting gateway 36. Upon receiving an MTR packet 126 from the other gateway 36, the gateways (e.g., 36A) stop transmitting the TRN signals 120 and generate and transmit MP signals 130 which identify the common capabilities of the modem 32 to which they are not connected (e.g., 32A) and the modems 60 of the gateways. Thereafter, the negotiation procedures of the connections on networks 34A and 34B are completed independently according to the V.34 recommendation.

The contents of MP signals 130 are chosen such that the operation rates chosen in accordance with the V.34 recommendation are supported by all the modems. Thus, the rates of operation of the connections on networks 34A and 34B are substantially identical. In an embodiment of the invention, the contents of MP signals 130 are chosen as the common capabilities of the generating gateway 36 and the capabilities stated in the MTR packet 126 it receives. It is noted that the term capabilities used throughout the present application includes the capabilities of the modems and of the lines of networks 34A or 34B as determined from the training.

In some embodiments of the invention, gateways 36A and 36B continue to transmit TRN signals 120 until they receive the MTR packet 126 from the other gateway. As the time required to demodulate MP signals 122 and transmit MTR packets 126 is much shorter than the 2000 msec maximum transmission time of TRN signals 120, the prolonged transmission of TRN signals 120 does not violate the V.34 recommendation.

After the negotiation is completed, modems 32A and 32B transmit to each other data signals at the rates set during the negotiation. In some embodiments of the invention, before beginning to transmit data, gateways 36 transmit to each other data phase negotiation (DPN) packets 132 notifying that data transmission follows. The data transmitted by modem 32A is received by modem 60A which transfers the data to IP interface 48A for transmission on UDP connection 70. IP interface 48A packages the received signals into packets. In some embodiments of the invention, the length of the data payload of the packets is substantially equal to the processing block size of modems 60 of the gateway. For example, if the transmission rate is 28.8 Kbps and modem 60 processes blocks every 20 msec, the length of the data payload of the packets is 576 bits. In an embodiment of the invention, if the number of data payload bits of a packet is not divisible by eight, padding bits (e.g., '0' bits) are added so that the packet has an integer number of bytes.

In some embodiments of the invention, controller 46 (or any other unit of gateway 36A) examines the contents of the signals passed from modem 60A to IP interface 48A to determine whether the signals include information. Signals which do not include information, i.e., signals which include filler sequences defined by modem recommendations, such as long sequences of '1' bits or idle ECDC 7E signals, are discarded and are not transmitted by interface 48A over UDP connection 70. In some embodiments of the invention, controller 46 replaces the discarded signals by control packets transmitted, for example, on TCP connection 72 which state the number and/or nature of the discarded bits so that gateway 36B can fill in the discarded signals. Alternatively, control signals are not transmitted instead of the discarded signals and gateway 36B fills in the missing signals based on the rates of the modems in connection 30. By discarding signals which do not carry information, the load on packet based network 38 is reduced allowing higher utilization rates of the packet based network.

In some embodiments of the invention, the data packets transmitted by IP interface 48A are delayed by jitter buffer 58B such that nearly all the signals reach IP interface 48B after a fixed delay. In an embodiment of the invention, signals which do not reach IP interface 48B within the fixed delay are discarded and are considered lost in packet based network 38. In some embodiments of the invention, the fixed delay compelled by jitter buffer 58 is substantially the maximum delay which does not cause the total delay between modems 32A and 32B to go beyond the maximal delay allowed by the protocol governing the transmission on connection 30. Alternatively, the fixed delay is set substantially in accordance with any of the methods known in the art regarding VoIP and/or Fax over IP (FoIP). In some embodiments of the invention, the fixed delay compelled by jitter buffer 58 is set dynamically based on the rate of packet loss in packet based network 38.

The signals in the data packets received by IP interface 48B are passed to modem 60B which transmits the signals to answer modem 32B. In some embodiments of the invention, when fewer signals than required for the rate of transmission of connection 30 are received, gateway 36B generates filler bits as defined in modem recommendations. In some embodiments of the invention, the filler bits are generated at least partially based on control packets transmitted from gateway 36A.

In some embodiments of the invention, the transmission of signals from modem 32B to modem 32A is substantially as described above regarding the transmission in the other direction. Alternatively, different transmission options are used for the different directions. For example, the discarding of signals may be performed in only one direction according to the load on packet based network 38.

In some embodiments of the invention, the data transmitted between gateways 36 is encrypted in order to prevent eavesdroppers from understanding the contents of the transmitted data. The encryption is especially useful when packet based network 38 is not completely controlled by individuals who are obliged to adhere to high standards of secrecy.

In some embodiments of the invention, whenever a retrain, re-negotiate and/or terminate event occurs in one of the modem connections on switched networks 34A or 34B, the gateway participating in the modem connection in which the event occurred sends a notification packet identifying the event to the other gateway. Responsive to the notification packet, the other gateway initiates the same event in the other modem connection.

Figure 7B:
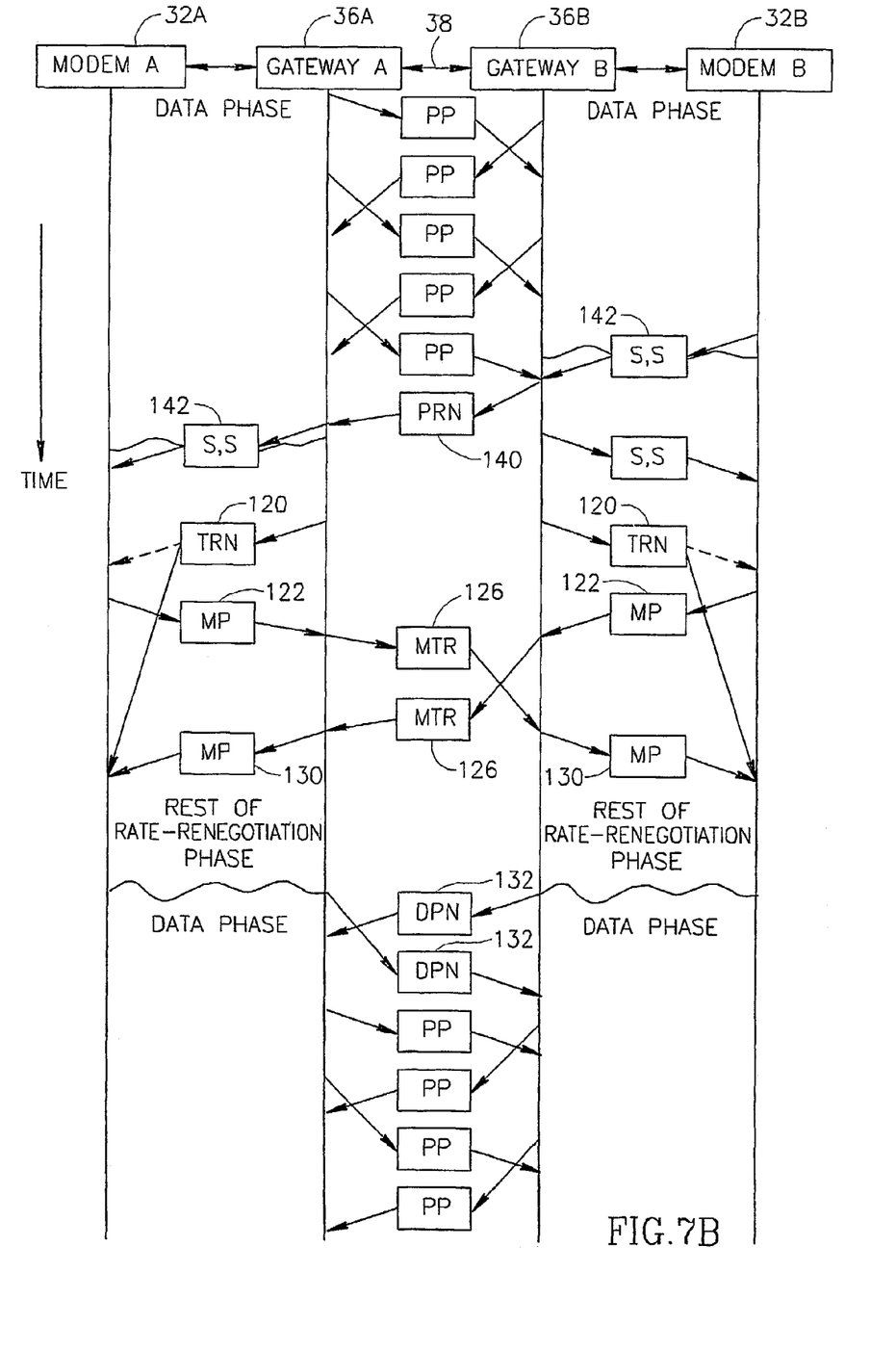
FIG. 7B is a time chart of the operations performed during a re-negotiation event, in accordance with an embodiment of the present invention.

FIG. 7B is a time chart of the operations performed during a re-negotiation event, in accordance with an embodiment of the present invention. When a re-negotiation is initiated by modem 32B, gateway 36B receives the S,$\overline{S}$ signals 142 which signal the re-negotiation event in the V.34 recommendation. Upon receiving S,$\overline{S}$ signals 142, gateway 36B transmits a renegotiation packet (PRN) 140 to gateway 36A, which immediately initiates a re-negotiation on its connection with modem 32A. The connections between modem 32A and gateway 36A and between modem 32B and gateway 36B both return to the beginning of phase 4, transmitting TRN messages 120 and 121 and then MP messages 122, as described hereinabove.

The termination procedure of the V.34 recommendation includes transmitting MP signals which state zero rates. In some embodiments of the invention, the information in these MP signals is transmitted to the other gateway 36 in an MTR packet 126. Alternatively, as the information in the MP signal is not required by the other gateway 36, a down signal packet that merely indicates the termination event is sent to the other gateway.

It is noted that although the above description relates to the V.34 full duplex protocol, the present invention is not limited to any specific protocol and may be implemented with relation to substantially any other modem protocol (e.g., V.22, V.32, V.90, V.91). For each specific protocol, a method in accordance with the protocol is used to stall the negotiation of a connection until information on the parameters of a peer connection are received. In some embodiments of the invention, the stalling includes transmitting signals beyond their usual transmission time, and/or transmitting guess values and initiating a retrain or a renegotiation if the guess signals had incorrect values. Alternatively or additionally, the stalling includes transmitting corrupted signals which are recognized by the other end modem as belonging to the protocol but do not fit into the specific requirements from the signal which allow proceeding of the negotiation. Procedures for correlating the transmission rates of V.90 modem connections are described, for example, in PCT application PCT/IL00/00288 titled "Back to Back Modem Repeater", the disclosure of which is incorporated herein by reference. Other correlation procedures are described in Israel patent application 136,775 titled "Modem Relay Over Packet Based Network", the disclosure of which is incorporated herein by reference.

It is noted that in some of the modem protocols the required timing constraints are so tight during the negotiation procedure, such that in many cases the negotiation procedure for achieving equal upstream and/or downstream transmission rates on the modem connections requires a retrain procedure. In some embodiments of the invention, during a protocol negotiation procedure, e.g., the V.8 procedure, gateways 36A and/or 36B prevent the selection of these protocols to avoid the extra connection time required for the retrain. Alternatively, the user of call modem 32A may select whether or not to forego protocols that require a retrain. Further alternatively, gateways 36A forego a protocol that requires retrain only if another protocol having similar characteristics may be chosen.

It is noted that the present invention may be implemented by a telephone service provider with or without the knowledge of the users. It is noted that the total delay of MoIP connections is accordance with the present invention are between about 100-300 msec, and therefore the delay is not generally identified by users of modems. In addition, packet based network maintainers may implement some embodiments of the present invention in order to provide alternative communication services. For example, instead of calling a target modem in an expensive long distance call, a client may call a local gateway, which forms a packet base connection with a remote gateway in the vicinity of the target modem and a modem connection from the remote gateway to the target modem. In some embodiments of the invention, Internet service providers (ISPs) may provide in addition to standard Internet access, modem access services, which allow secure transmission of signals to a remote modem.

It is noted that although the above description relates to connections which include two modem connection segments and a packet based segment, some embodiments of the invention pertain to connections which have more or fewer modem connection segments. For example, a connection may be formed of three modem connection segments connected through two packet-based segments. Such a connection may be formed, for example, when a call passes between a plurality of telephone and/or IP suppliers.

It is further noted that the present invention is not limited to transmission of VBM signals over IP networks. Rather, the present invention may be applied for transmission of VBM signals over other packet based or cell based networks, such as ATM networks and frame relay networks. Furthermore, the VBM connections of the present invention may be transferred on both analog lines and digital trunks and on paths which are combinations thereof.

It will be appreciated that the above-described methods may be varied in many ways, including, changing the order of steps, and the exact implementation used. It should also be appreciated that the above-described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of transmitting, non-facsimile, data signals between a source modem and a destination modem, comprising:
   receiving data signals transmitted from the source modem, over a first switched network path, by a first gateway;
   demodulating the data signals at the first gateway;
   transmitting at least some of the demodulated data signals from the first gateway to a second gateway, remote from the first gateway, over an intermediate path;
   modulating the data signals at the second gateway; and
   transmitting the modulated data signals from the second gateway over a second switched network path to the destination modem,
   wherein transmitting at least some of the demodulated data signals comprises determining, by the first gateway, whether the data signals received from the first modem have an information content and not transmitting at least some of the signals determined not to have an information content.

2. A method according to claim 1, wherein transmitting at least some of the demodulated signals over the intermediate path to the second gateway comprises regulating the delay of the packets provided to the second gateway.

3. A method according to claim 1, wherein the source and destination modems comprise server modems.

4. A method according to claim 1, wherein the data signals are received by the destination modem in a manner which does not allow determination of whether the signals were passed on the intermediate path or were passed on a single switched path.

5. A method according to claim 1, wherein the signals are transmitted on the first switched network path to the first gateway at a different rate than the signals are transmitted from the second gateway on the second switched network path.

6. A method according to claim 1, wherein transmitting the packets over the packet based network comprises transmitting over a connection which does not provide delivery confirmation.

7. A method according to claim 1, wherein transmitting at least some of the data signals over a packet based network comprises transmitting over a connection which provides delivery confirmation.

8. A method according to any of the preceding claims, wherein transmitting at least some of the demodulated data signals from the first gateway to the second gateway comprises transmitting encrypted signals.

9. A method according to claim 1, wherein the first gateway does not decompress the data signals it transmits to the second gateway.

10. A method according to claim 9, wherein the first gateway performs one or more error correction tasks on the signals it transmits to the second gateway.

11. A method according to claim 1, comprising replacing the signals determined not to have an information content by control signals identifying the discarded signals.

12. A method according to claim 1, wherein the signals determined not to have an information content are not replaced by control signals.

13. A method according to claim 1, wherein transmitting the data signals from the second gateway over a second switched network path comprises transmitting for some signals not carrying information a representation different from a representation of the signals in the received data signals transmitted from the source modem.

14. A method according to claim 1, wherein the signals determined not to have an information content comprise signals including filler sequences defined by a modem recommendation.

15. A method according to claim 1, comprising performing negotiating procedures by the first and second gateways with the source and destination modems, respectively, before receiving the data signals by the first gateway, and wherein the first gateway receives information from the second gateway on its negotiations, determines whether the information from the second gateway conforms to the negotiations of the first gateway and if the negotiations do not conform, performs a retrain of the first connection.

16. A method according to claim 15, wherein the first gateway performs a retrain if the negotiations select different bit rates for the first and second network paths.

17. A method according to claim 1, wherein the first gateway does not perform error correction tasks on the signals it transmits to the second gateway.

18. A gateway for transferring, full duplex, voice band modem signals between a switched network and a packet based network, comprising:
   a switched network interface adapted to concurrently transmit and receive modulated modem signals on a switched network path;

a modem adapted to modulate signals transmitted by the switched network interface and demodulate signals received by the switched network interface;

a packet interface adapted to transmit and receive signals on a packet based network connection; and a controller adapted to establish a logical connection between a switched network path and a packet based network connection, before data signals are transmitted on the switched network path, and to forward at least some of the data signals passing on the logical connection between the packet interface and the modem, wherein the controller is configured to determine whether the data signals received through the switched network interface have an information content and is configured not to forward at least some of the signals determined not to have an information content.

19. A gateway according to claim 18, wherein the gateway does not perform modem compression or decompression on the data signals passing on the logical connection.

20. A gateway according to claim 18, wherein the gateway does not perform modem flow control tasks on the data signals passing on the logical connection.

21. A gateway according to claim 18, wherein the gateway does not perform modem error correction tasks on the data signals passing on the logical connection.

22. A gateway according to claim 18, wherein the gateway is adapted to apply error correction tasks to data signals passing on the logical connection.

23. A system for transmission of, full duplex non-facsimile, modem signals over a packet based network, comprising:

first and second gateways adapted to receive data signals from first and second modems, to demodulate the received data signals and to transmit the demodulated data signals over an intermediate network, to receive the data signals transmitted over the intermediate network, to modulate the signals and to transmit the data signals to the second and first modems, respectively, wherein the rates at which the first gateway transmits and receives data signals from the first modem and the rates at which the second gateway transmits and receives data signals from the second modem are different, wherein the gateways are configured to determine whether the data signals received from the modems have an information content and are configured not to forward to the other gateway at least some of the signals determined not to have an information content.

24. A system according to claim 23, wherein the first gateway is adapted to transmit the demodulated signals to the second gateway without decompressing the signals.

25. A system according to claim 23, wherein the second modem receiving the signals from the second gateway cannot determine whether the received signals were transmitted from the second gateway or directly from the first modem without passing over the intermediate network.

* * * * *